Sept. 20, 1966     D. H. SCHULER     3,273,733

GRAIN WAGON

Filed June 11, 1964     2 Sheets-Sheet 1

INVENTOR
DORLAND H. SCHULER
BY Dick & Zarley
ATTORNEYS

Sept. 20, 1966 D. H. SCHULER 3,273,733
GRAIN WAGON
Filed June 11, 1964 2 Sheets-Sheet 2
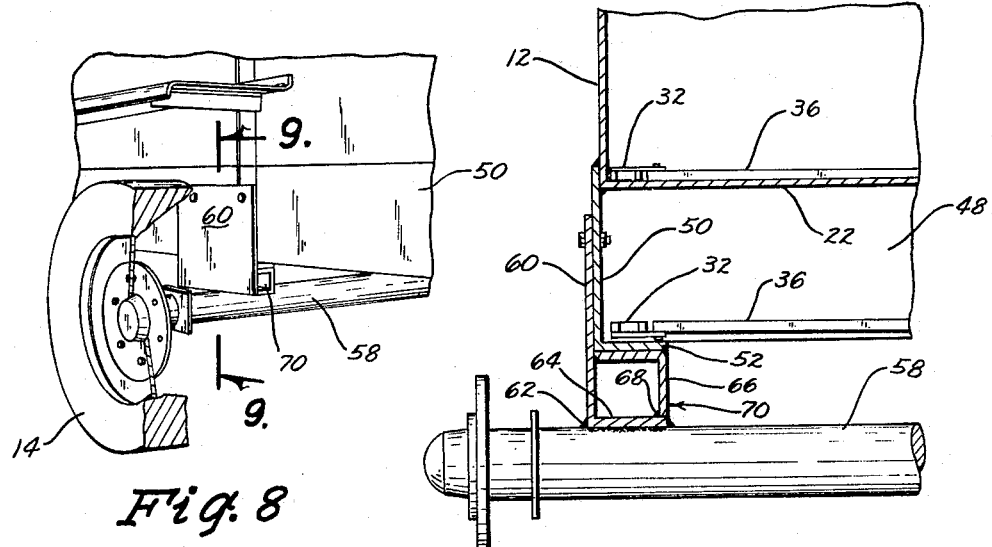
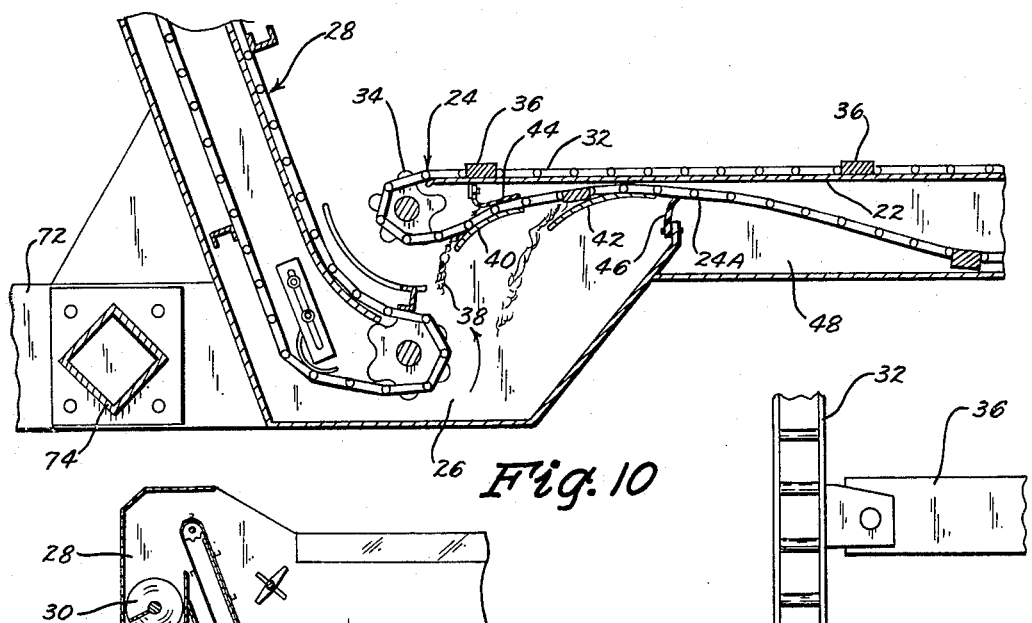
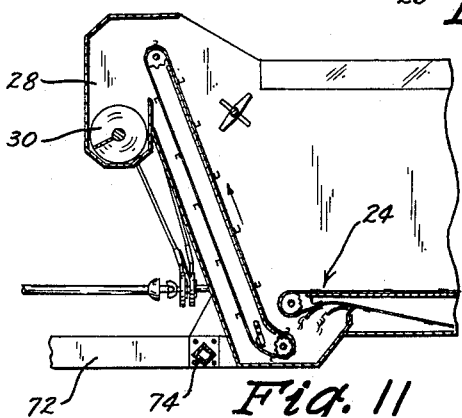
INVENTOR
DORLAND H. SCHULER
BY
Dick + Zarley
ATTORNEYS United States Patent Office 3,273,733
Patented Sept. 20, 1966

3,273,733
GRAIN WAGON
Dorland H. Schuler, Griswold, Iowa
Filed June 11, 1964, Ser. No. 374,455
11 Claims. (Cl. 214—519)

This invention relates to a grain wagon and in particular to a wagon which may be used as a mixing and blending machine.

This application is a continuation-in-part of applicant's copending application Serial No. 311,748 filed September 26, 1963.

The grain wagon of this invention is described in detail in applicant's copending application and includes the operation of filling the wagon with grain and commercial feed and by the use of a conveyor system discharging the mixture from the wagon and returning it to the wagon, thereby mixing it as it moves through the cycle of operation. When the blending and mixing operation has been completed, the return feed material conveyor is positioned for discharge of the feed at a feeding station or the like.

It is one of the objects of this invention to provide a wagon having a floor conveyor which utilizes a minimum of space.

It is a further object of this invention to provide a grain wagon having a floor conveyor where a means is provided for cleaning the conveyor chains and slats.

A still further object of this invention is to provide a grain wagon having an extremely strong frame construction formed from a minimum of materials which are light in weight.

Another object of this invention is to provide a farm wagon having a tongue structure which permits the tractor or the like pulling the wagon to turn at an angle of 90 degrees to the wagon.

A still further objects of the invention is to provide a grain wagon having a front end stationary support means which may be quickly positioned for supporting the front end of the wagon while separated from the tractor or the like.

Another object of this invention is to provide a wagon having a jack support structure which will automatically move to an inoperative position when the wagon has been hitched to a tractor or the like.

It is a further object of this invention to provide a grain wagon which is simple in design, economical to manufacture and refined in appearance.

This invention consists in the construction, arrangements, and combination, of the various parts of the device, whereby the objects contemplated are attained as hereinafter more fully set forth, specifically pointed out in the claims, and illustrated in the accompanying drawings, in which:

FIG. 8 is a fragmentary perspective view of the wagon frame and its connection to the wheel and axle support assembly;

FIG. 9 is a cross sectional view taken along line 9—9 in FIG. 8 showing in detail the wagon floor and conveyor assembly movable there around in relation to the frame means for connecting the wagon to the wheel axle;

FIG. 10 is a cross sectional elevational view taken along line 10—10 in FIG. 2 showing in particular the floor conveyor system, the means for cleaning the conveyor system, the manner by which a minimum of space is required to accommodate the conveyor system, and a portion of the wagon frame connection to the wagon tongue;

FIG. 11 is a fragmentary side elevation view similar to FIG. 10 but reduced in scale and showing most of the forward end of the wagon and in particular the floor conveyor in cooperation with the vertical conveyor from the wagon trough discharging into a discharge auger; and FIG. 12 is a fragmentary enlarged in scale top plan view of the floor conveyor showing in particular the chain links and their connection to a transverse slat.

Figure 1:
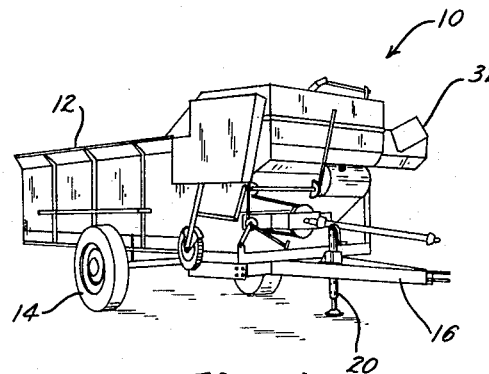
FIG. 1 is a perspective view of the wagon from the forward end thereof.

The wagon of this invention is referred to in FIG. 1 generally by the reference numeral 10 and includes the wagon box 12 carried on a set of wheels 14. A tongue assembly 16 is provided at the forward end of the wagon 10 and used both to support the front end of the wagon by its connection to a tractor 18 (FIG. 2) or a jack assembly 20 when disengaged from a tractor or the like.

As illustrated in FIGS. 2 and 8 through 11, the wagon box 12 is provided with a floor 22 around which a conveyor 24 moves. As best shown in FIG. 10, the conveyor 24 discharges into a trough 26 where a vertical conveyor 28 moves the grain to a second trough 28 in which an auger 30 operates (FIG. 11) for discharge of the grain outwardly of the wagon 10 through the spout assembly 32 as illustrated in FIG. 1.

The conveyor 24 includes a pair of link chains 32 on opposite sides of the floor 22 which are engaged and driven by cog wheels 34. A series of slats 36 extends between the chains 32. Under the return portion 24A of the conveyor 24, arcuate chain lift guides 40 and 42 are provided for engagement with each of the chains to direct the return chain 24A upwardly at an angle to the floor 22. As seen in FIG. 10, the angular position of the return conveyor portion 24A causes the grain 38 to drop from the chains 32 and the slats 36 into the trough 26. Should any grain pass along the chains past the first guide 40, it will very likely drop between the guide 40 and the next guide 42. Further cleaning action is accomplished by a canvas curtain 44 secured to the bottom side of the floor 22 which frictionally engages the top side of the return conveyor 24A. Also a second wiper member of rubber or the like material 46 is provided at the upper read end of the trough 26 for frictional engagement with the lower side of the return conveyor 24A and prevents any grain that should pass by both guides 40 and 42 from moving into the space 48 under the floor 22 wherein the return conveyor 24A moves as it completes its cycle of operation.

By the construction of the wagon 10 as illustrated in FIGS. 8 and 9, the space 48 required for the return conveyor 24A is reduced to a minimum. The space or chamber 48 is defined by plate members 50 on opposite sides of the floor 22 which extend downwardly from the side walls of the wagon box 12 and terminate in inwardly extending flange portion 52 on which the chains 32 movably slide as the conveyor 24A returns to the top side of the floor 22. As seen in FIG. 9, the slats 36 are exposed since no sub-floor for the return conveyor 24A is required.

To connect the wagon box 12 to the wheel axle 58, a vertical plate 60 is bolted to the plate 50 and is connected by welds 62 to the axle 58 and also terminates in a horizontal flange portion 64 extending along the axle 58. An L-shaped plate member 66 complementary in shape to the portion 64 and the distance between the axle 58 and the portion 52 is provided and secured by welds 68 to the L-shaped plate assembly 60 and 64 and defines thereby a square in cross section channel 70. Thus it is seen that by this simplified construction only a minimum of material is required for connecting the wagon box 12 to the wheel axle 58.

Figure 2:
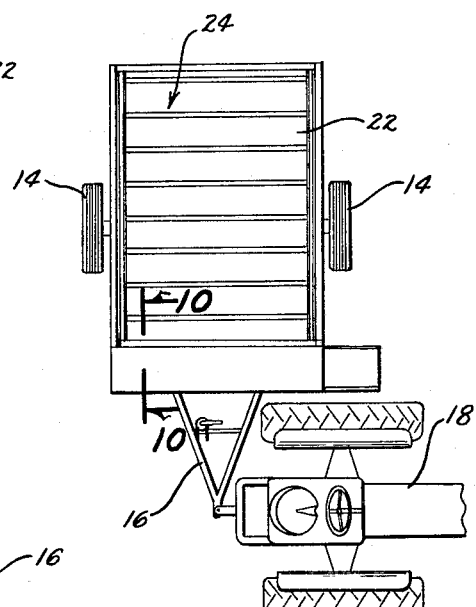
FIG. 2 is a top plan view of the wagon connected to a farm tractor and in particular showing the tractor positioned at a 90-degree angle to the wagon.
Figure 3:
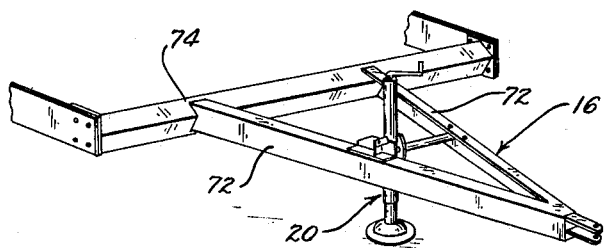
FIG. 3 is a perspective view showing only the wagon frame construction in combination with the wagon tongue and jack support assembly.

The tongue assembly 16 (FIG. 3) is V-shaped in construction and includes a pair of members 72 which are fixedly secured to a transverse wagon frame member 74 at points substantially offset inwardly from the outer ends of the transverse member 74. The member 74 is hollow and square in cross section (FIGS. 10 and 11) and is turned 45 degrees such that each pair of diagonally opposite corners are disposed in horizontal and vertical planes. By this positioning, the transverse member 74 presents a substantially stronger connection to the free ends of the tongue members 72. The greatest forces exerted on the transverse member 74 are along the horizontal and vertical planes coinciding with the two diagonal planes extending through the two pairs of opposite corners of the transverse member 74. By having the additional strength in the transverse member 74, it is possible to offset inwardly the members 72 of the tongue 16 and thereby enable the tractor 18 to make a sharp 90-degree turn without interference from the wagon tongue as best illustrated in FIG. 2.

Figure 4:
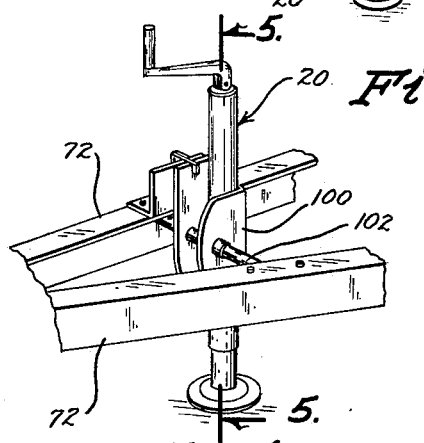
FIG. 4 is a fragmentary perspective view of the jack support assembly in its position of use.
Figure 6:
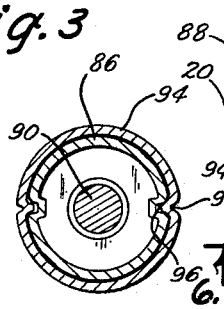
FIG. 6 is a cross sectional view taken along line 6—6 in FIG. 5.
Figure 5:
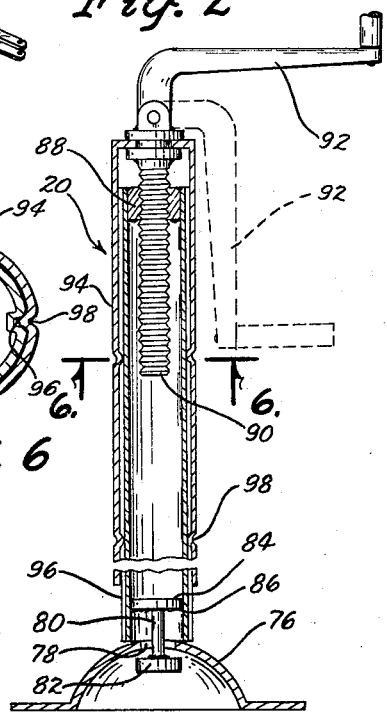
FIG. 5 is a cross sectional elevational view taken along line 5—5 in FIG. 4 and showing in detail the construction of the jack support assembly.

To simplify the wagon's construction, only a single set of wheels 14 have been provided and thus when the tractor 18 or the like is disengaged therefrom, a support means at the front end of the wagon is required. As illustrated in FIGS. 1 through 7, the jack assembly 20 is provided and carried by the tongue 16. In FIG. 5, the jack 20 is shown to include a base ground engaging convex member 76 having a center opening 78 formed therein which receives a pin 80. A head element 82 is welded onto the lower end of the pin 80 to prevent its upward movement through the center opening 78. However, angular movement relative to the vertical is permitted since the pin 80 is substantially smaller in diameter than the opening 78 in the base 76. The upper end of the pin 80 is welded to a head 84 which in turn is welded to a tube 86 inwardly from its lower end which is in bearing engagement with the outer convex surface of the base member 76. The upper end of the tube 86 is provided with a threaded member 88 which receives a threaded shaft 90 connected to a handle 92. A second tube 94 telescopically embraces the tube 86 and rotatably receives through its upper end the shaft 90. To prevent relative rotation between the tubes 86 and 94, they each are provided with a pair of grooves 96 and ribs 98 in mating engagement with each other along their outer surfaces diametrically opposite each other. Thus, as the handle 92 is rotated, the tubes 86 and 94 move towards and away from each other depending on the direction of rotation of the handle 92.

The outer tube 94 of the jack assembly 20 is fixedly secured to a U-shaped bracket 100 which is mounted on a shaft 102 extending between the tongue members 72. A notch 104 is formed in the upper end of one leg of the U-shaped member 100 for locking engagement with a latch 106 mounted on the tongue member 72 (FIG. 7) whereby the jack assembly 20 may be held in a locked upright vertical position as illustrated in FIG. 4 for supporting the front end of the wagon 10.

Figure 7:
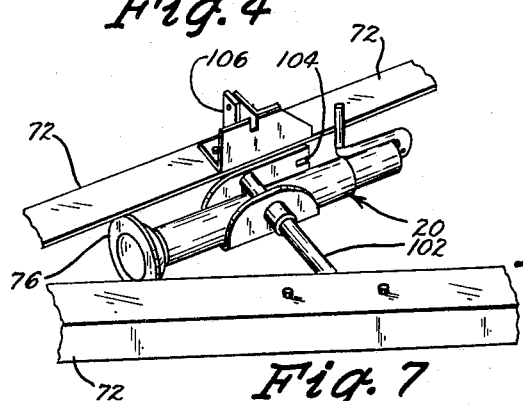
FIG. 7 is a fragmentary perspective view similar to FIG. 4, but showing the jack support assembly in its transport position.

The weight of the jack assembly 20 is distributed such relative to the axis of rotation along the shaft 102 that upon disengagement of the latch 106 from the notch 104, the jack 20 will automatically pivot to a horizontal position as illustrated in FIG. 7. The rotational movement of the jack 20 is limited by the tongue member 72 serving as stop means since the base 76 of the jack 20 cannot pivot therebetween. When it is desired to return the jack 20 to its upright vertical position, it is only necessary to overcome the natural off center rotational forces of the jack 20 about the shaft 102. With the latch 106 in engagement with the notch 104 and the U-shaped bracket 100, the jack 20 is held positively in its vertical upright position. When the jack 20 is not in use, the handle 92 may be pivoted to its out-of-the-way position represented by the dash lines 92 in FIG. 5.

From a consideration of the foregoing disclosure, it will be obvious that all of the initially recited objects of the present invention have been achieved.

Some changes may be made in the construction and arrangement of my grain wagon without departing from the real spirit and purpose of my invention, and it is my intention to cover by my claims, any modified forms of structure or use of mechanical equivalents which may be reasonably included within their scope.

I claim:
1. In a grain wagon, comprising,
   a floor terminating at one end of said wagon in a trough,
   an endless conveyor movable around said floor and being defined by a pair of chains on each side of said floor and slats extending therebetween in spaced relationship along the length of said chains,
   means for moving said conveyor around said floor for carrying grain material on said floor into said trough,
   means for removing grain from said trough, and
   a plurality of laterally and longitudinally spaced apart guide cleaning means in engagement with each of said chains adjacent said trough end of said floor to direct the return chain under said floor upwardly at an angle to the floor whereby grain will fall from said slats and said grain will fall from said chains between said spaced apart guide cleaning means into the trough.

2. The structure of claim 1 and a wiper means engaging the top side of said chains and slats while disposed at said angle to the floor to remove grain therefrom before said chains and slats leave the trough area and move to the opposite end of the floor.

3. The grain wagon of claim 2 and further a wiper means positioned at the forward end of the guide means along the line of travel of said return chain to engage the lower side of said chains and wipe therefrom any residual grain or the like into said hopper.

4. In a grain wagon, comprising,
   a storage chamber having a trough at one end thereof,
   a floor extending the length of said storage chamber with one end terminating adjacent said trough,
   a conveyor movable around said floor in a direction to deposit grain in said trough,
   a member extending along and below said floor on each side thereof, each of said members being secured to said floor and having inwardly extending portions for supporting and guiding the side edges of the return portion of said conveyor, said inwardly extending portions extending substantially the length of said floor and defining therebetween an open space under said floor through which said conveyor is exposed, and
   an L-shaped member connected to each of said first mentioned members with one leg vertically disposed and secured to said first mentioned member between the floor of said wagon and the return conveyor portion, the second leg portion of said L-shaped member being horizontally disposed and secured to said inwardly extending portion,
   an axle with wheels at opposite ends under said wagon, and
   said axle being connected to the second leg of said L-shaped member.

5. The wagon of claim 4 wherein said second leg portion is in the form of an enclosed channel and has a length substantially shorter than the length of said wagon.

6. In a grain wagon, comprising,
a storage chamber having a trough at one end thereof,
a floor extending the length of said storage chamber with one end terminating adjacent said trough,
a conveyor movable around said floor in a direction to deposit grain in said trough,
a hollow square in cross section member positioned with its two sets diagonally opposite corners in horizonal and vertical planes respectively, and secured in a lateral position to the front end of said wagon, and
a V-shaped tongue having a pair of free ends fixedly secured to said hollow member, the common end of said tongue extending forwardly of said wagon front end for coupling to a tractor or the like.

7. In a grain wagon, comprising,
a storage chamber having a trough at one end thereof,
a floor extending the length of said storage chamber with one end terminating adjacent said trough,
a conveyor movable around said floor in a direction to deposit grain in said trough,
a hollow square in cross section member positioned with its two sets diagonally opposite corners in horizonal and vertical planes respectively, and secured in a lateral position to the front end of said wagon, and
a V-shaped tongue having a pair of free ends fixedly secured to said hollow member, the common end of said tongue extending forwardly of said wagon front end for coupling to a tractor or the like, said free ends being substantially inwardly offset laterally from the ends of said hollow member to permit 90-degree turning by a tractor or the like coupled to said tongue.

8. In a grain wagon, comprising,
a storage chamber having a trough at one end thereof,
a floor extending the length of said storage chamber with one end terminating adjacent said trough,
a conveyor movable around said floor in a direction to deposit grain in said trough,
a tongue secured to and extending forwardly from said wagon,
a jack support pivotally secured at a point intermediate its ends to said tongue, such that the balance of weight of said jack normally pivots it to a horizontal position from a vertical position, and
means for locking said jack in a vertical position to support said tongue above a support surface.

9. In a grain wagon, comprising,
a storage chamber having a trough at one end thereof,
a floor extending the length of said storage chamber with one end terminating adjacent said trough,
a conveyor movable around said floor in a direction to deposit grain in said trough,
a V-shaped tongue having spaced apart legs with free ends, said free ends being secured to the forward end of said wagon, and
a jack support pivotally secured between said tongue legs at a point on said jack intermediate its ends such that the balance of weight of said jack normally pivots it to a horizontal position.

10. The structure of claim 9 wherein said jack has one end which upon pivotal movement is limited by engagement with the converging legs of said V-shaped tongue.

11. The structure of claim 9 wherein said jack is pivotally connected at a point offset from the longitudinal axis of said jack.

References Cited by the Examiner

UNITED STATES PATENTS

| | | | |
|---|---|---|---|
| 1,793,246 | 2/1931 | Philips | 198—230 |
| 2,496,463 | 2/1950 | Gaddis | 214—83.36 |
| 2,750,059 | 6/1956 | Hintz et al. | 214—519 |
| 2,956,808 | 10/1960 | Miller | 275—6 |
| 3,063,723 | 11/1962 | Toft | 214—519 X |

GERALD M. FORLENZA, *Primary Examiner.*

A. J. MAKAY, *Assistant Examiner.*